Dec. 27, 1927.　　　　　　　　　　　　　　　1,654,496
B. P. GRAVES
MILLING MACHINE
Filed Aug. 5, 1922　　　　5 Sheets-Sheet 2
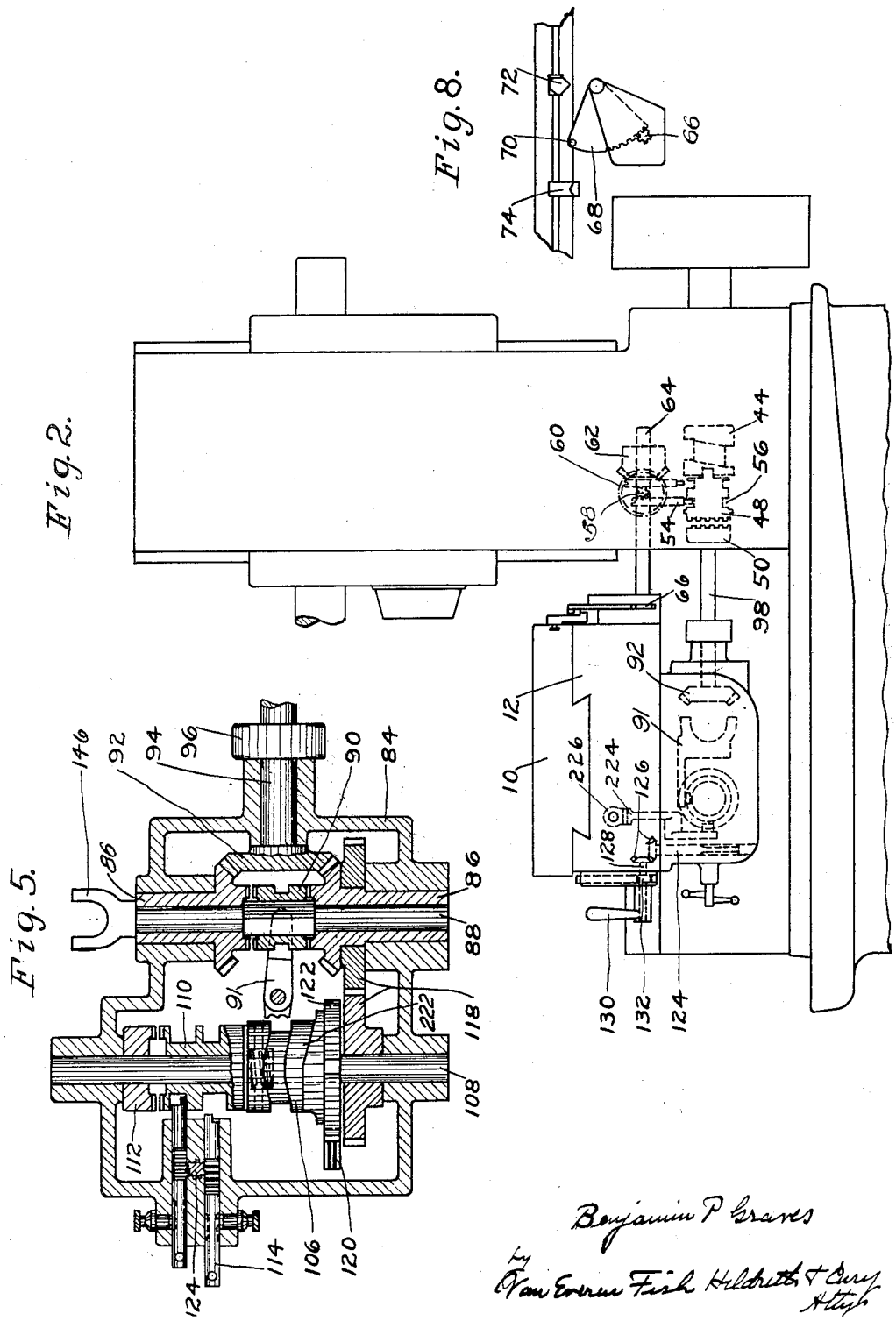

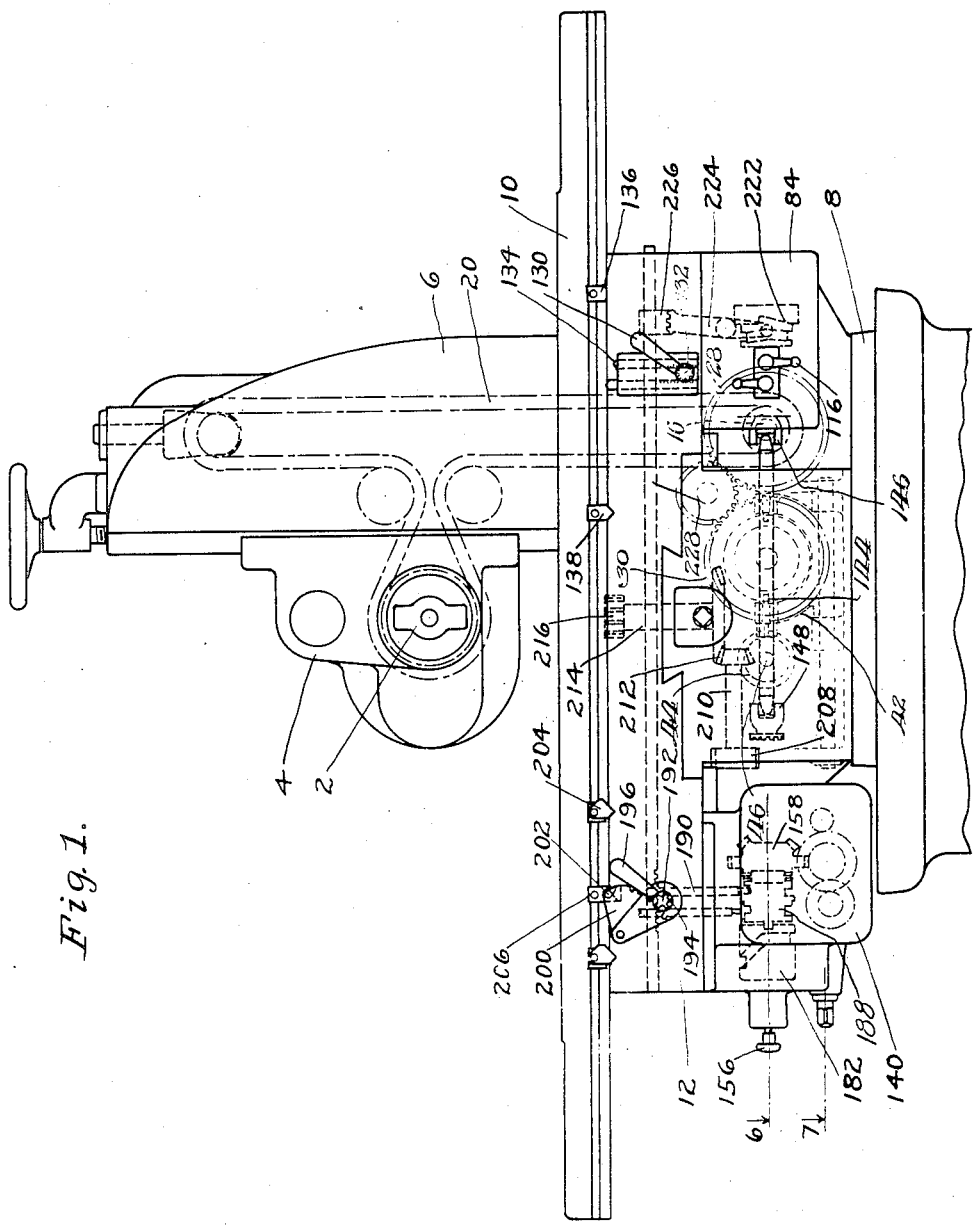

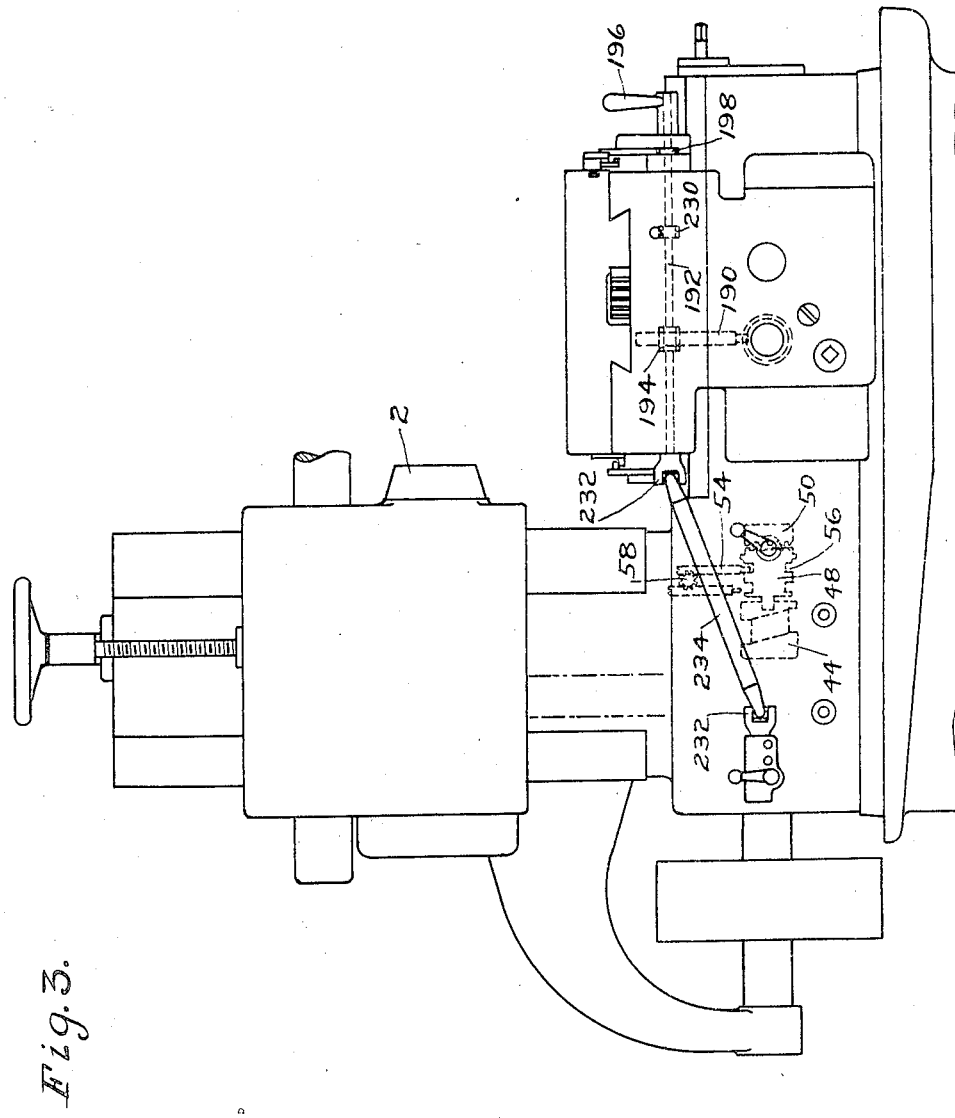

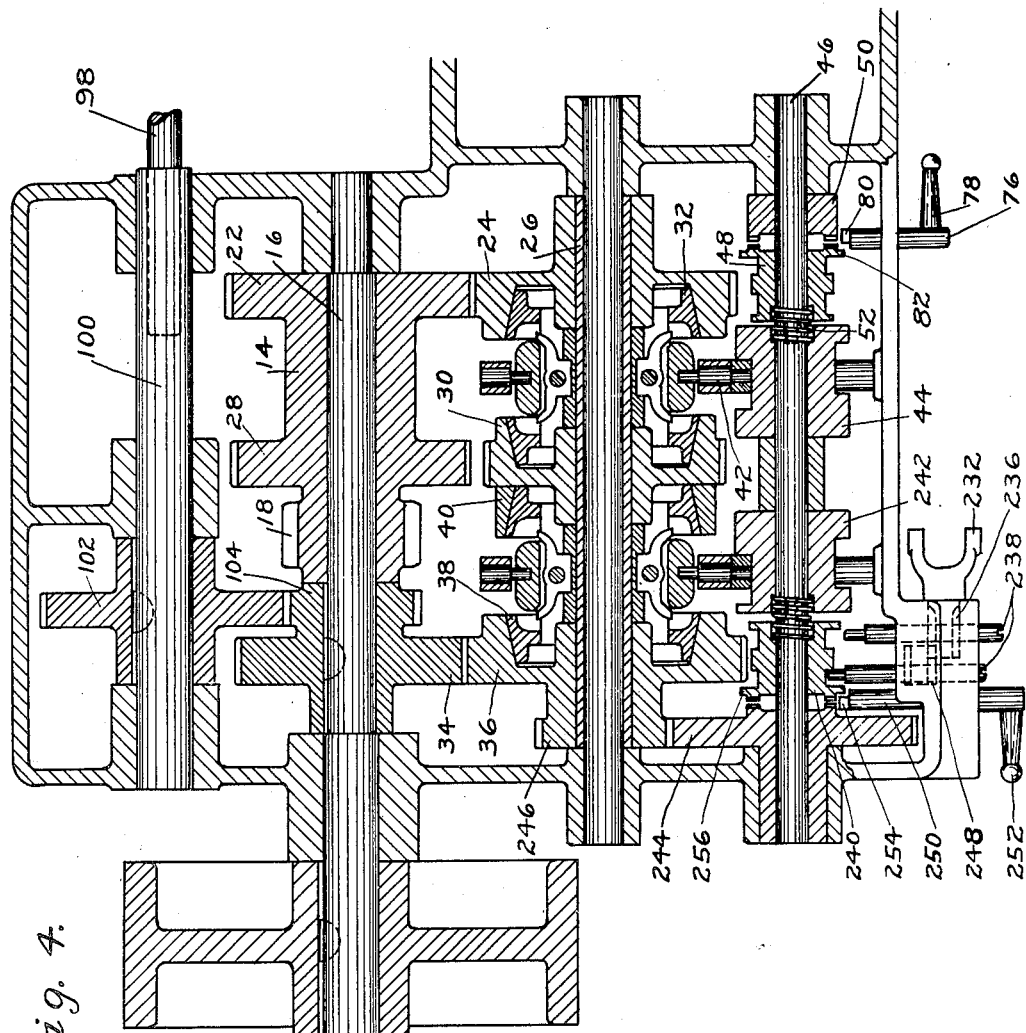

Dec. 27, 1927.
B. P. GRAVES
1,654,496
MILLING MACHINE
Filed Aug. 5, 1922　　5 Sheets-Sheet 5
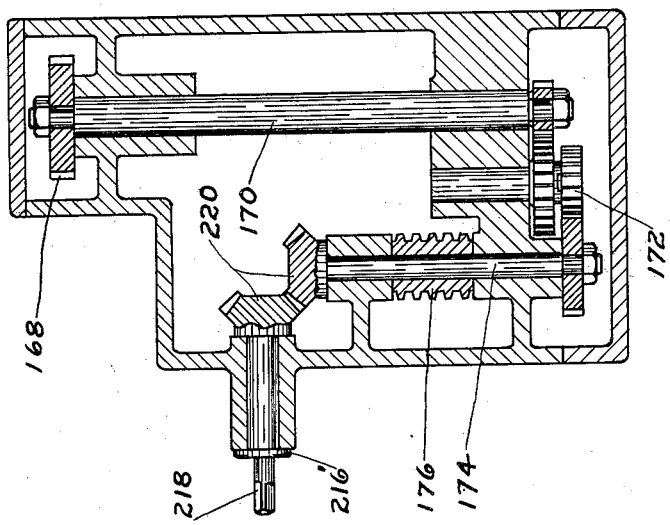
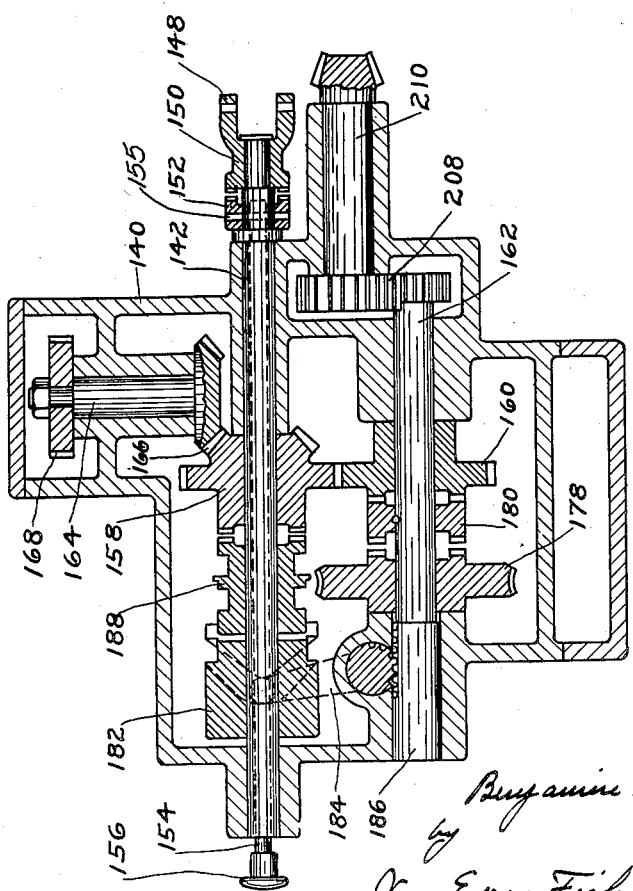

Patented Dec. 27, 1927.

1,654,496

UNITED STATES PATENT OFFICE.

BENJAMIN P. GRAVES, OF PROVIDENCE, RHODE ISLAND, ASSIGNOR TO BROWN AND SHARPE MANUFACTURING COMPANY, A CORPORATION OF RHODE ISLAND.

MILLING MACHINE.

Application filed August 5, 1922. Serial No. 579,907.

The invention relates to milling machines which have provision for automatically controlling the relative movements of the spindle and work table so that the machine is adapted for the rapid production of various kinds of work.

It is the object of the invention to increase the range of work which may be efficiently done on this type of machine and also to provide a compact, convenient and efficient construction and arrangement of the driving and controlling mechanisms. To these ends the invention comprises the features of construction and the combination and arrangement of parts and mechanisms hereinafter described and set forth in the claims.

The preferred form of the invention is illustrated in the drawings in which Fig. 1 is a front elevation of a milling machine embodying the features of the invention in their preferred forms, Fig. 2 is a right hand side elevation, Fig. 3 is a left hand side elevation, Fig. 4 is a horizontal sectional view through the driving shaft, Fig. 5 is a horizontal sectional view through the table reversing mechanism, Fig. 6 is a horizontal sectional view through the table feed mechanism on line 6, Fig. 1, and Fig. 7 is a horizontal sectional view on line 7, Fig. 1, Fig. 8 is a detail of the spindle reversing dogs, and Fig. 9 is a diagrammatic view of parts of the transmission and controlling mechanisms.

The invention is shown embodied in a machine of the manufacturing type in which the spindle 2 is mounted in a carriage 4 vertically adjustable upon the column 6 which rises from the base 8 of the machine, and on which the work supporting table 10 is mounted to travel on a saddle or support 12 transversely adjustable on the machine base. The machine is provided with mechanism for causing the table to travel at a slow or fast speed in either direction and with mechanism for reversing or stopping the table at either end of its travel when travelling at either a fast or slow speed and with mechanism for starting and stopping the spindle and with controlling devices operated by adjustable tripping dogs on the table for automatically controlling these mechanisms. These mechanisms and controlling devices are similar in general construction and in mode of operation to the corresponding mechanisms and controlling devices of the patent to Rich, No. 1,355,167, Oct. 12, 1920. The machine is also provided with mechanism for rotating the spindle in opposite directions which is controlled by separate and independent controlling and tripping devices so that the spindle may be rotated in either direction during all or any part of the travel of the table in either direction and its direction of rotation may be reversed at any desired point in the travel of the table in either direction. This manner of controlling the rotation of the spindle is an important feature of the invention and enables the machine to be used with equal efficiency in milling material which requires the cut to be made against the feed in order to secure the best results, and in milling material which requires the cut to be made in the direction of the feed in order to secure the best results.

The mechanism for rotating the spindle comprises a sleeve 14 mounted to turn on the driving shaft 16 and provided with a sprocket wheel 18 from which motion is transmitted to the spindle through the belt 20 in the usual manner. The sleeve 14, and through it the spindle, may be driven in one direction through a gear 22 formed on the sleeve and directly engaging a gear 24 loosely mounted on a sleeve 26 or may be driven in a reverse direction through a gear 28 connected through an intermediate gear with a second gear 30 loosely mounted on the sleeve 26. Either of the gears 24 or 30 may be connected with the sleeve 26 by a clutch 32 connected to rotate with the sleeve and adapted to be engaged with either gear. The sleeve 26 is driven from the driving shaft 16 through a gear 34 secured to the driving shaft and engaging a gear 36 loosely mounted on the sleeve and adapted to be connected therewith by a clutch 38 which is connected to rotate with the sleeve. The clutch may be shifted either into engagement with the gear 36 to cause the spindle to be rotated or may be shifted into engagement with a fixed clutch member 40 to stop the spindle.

The mechanism for controlling the spindle reversing clutch 32 comprises a clutch shifting lever 42 which is operated by a cam 44 loosely mounted on a shaft 46 and connected with a clutch sleeve 48, also loosely mounted on the shaft. The shaft 46 is constantly driven from the gear 36 through a gear 246 on the hub of the gear 36 and a gear 244 secured to the shaft 46. The clutch sleeve is forced in a direction to engage it with a clutch member 50 secured to the shaft, by a spring 52 and is normally held out of engagement with the clutch member 50 by one or the other of two controller plungers 54, the lower ends of which are arranged to engage cam grooves 56 in the sleeve. The cams and controller plungers are so related that when one plunger is withdrawn to permit the engagement of the clutch the other plunger is advanced into the path of the corresponding cam groove so that the clutch is disengaged after it and the connected cam 44 have made a half revolution and have shifted the spindle reversing clutch to reverse the direction of rotation of the spindle. This mode of operation is more fully described in connection with similar clutch controlling and operating mechanisms in the Rich patent above referred to. The controller plungers 54 are advanced and retracted to reverse the spindle through a rock shaft 58 (Fig. 3) provided with gear teeth engaging rack teeth on the plungers and also provided with a beveled gear 60 (Fig. 2) engaging a similar gear 62 which is connected to rotate with a rock shaft 64 mounted on the saddle 12. The rock shaft is provided with a pinion 66 (Figs. 2 and 8) engaged by a controller gear segment 68 pivotally mounted on the rear side of the saddle and provided with a pin 70 projecting into the path of trip dogs 72 and 74 which are adjustably secured on the rear side of the table. These tripping dogs are so shaped and arranged that the dog 72 will engage the pin 70 and swing the segment 68 downward, thus rocking the shaft 64 to retract one of the controller plungers 54 and advance the other, while the dog 74 will raise the controller segment and rock the shaft 64 in the opposite direction to retract the latter plunger 54 and advance the other. By proper adjustment of the dogs 74 and 72 the direction of rotation of the spindle during any part of the travel of the table in either direction may be selectively determined and the direction of rotation of the spindle may be reversed at any selected point or points in the travel of the table. The cut may therefore be made either against or with the feed when the table is travelling in either direction or may be made with the feed at one part of the travel and against the feed at another part of the travel in the same direction. In cutting either with or against the feed during the travel of the table in opposite directions as, for instance, in continuous milling, two oppositely arranged cutters will be secured to the spindle as fully explained in the Rich patent above referred to. The same arrangement of cutters may be used in making successive cuts during the travel of the table in one direction, some of which may be made with and some against the feed. The spindle reversing mechanism may be rendered active or inactive at the will of the operator through a rock shaft 76, the outer end of which is provided with an operating handle 78, and the inner end of which is provided with an eccentric stop 80, which is moved by rocking the shaft either into position to engage a flange 82 on the clutch sleeve 48, and thus prevent the engagement of the clutch, or into position where it will not interfere with the movement of the clutch into and out of engagement.

To facilitate the adjustment or setting of the mechanism which controls the reversing or stopping of the table and to secure a compact and desirable arrangement of the motion transmitting trains the table reversing mechanism, as well as the mechanism for actuating the reversing clutch, is mounted on the saddle and the devices through which the operator sets the controlling mechanism to cause the table to be stopped or to be reversed are arranged at the front of the saddle within convenient reach of the operator when stationed at the front of the machine.

In the machine shown the table reversing mechanism is mounted in a casing or box 84 (Figs. 1 and 5) secured to the under side of the saddle at its right hand end. This mechanism comprises two oppositely rotating beveled gears 86 loosely mounted on a drive shaft 88 and adapted to be alternately connected therewith by an interposed reversing clutch 90. The gears are rotated in opposite directions by a beveled gear 92 secured to the forward end of a shaft 94 which is mounted in the box 84 and is connected through an Oldham coupling indicated at 96, with the forward end of a shaft 98. The rear end of the shaft 98 has a sliding and driving connection with a shaft 100 (Fig. 4) mounted in the base of the machine and continuously driven from the driving shaft 16 through the gears 102 and 104. The mechanism for shifting the reversing clutch 90 comprises a clutch shifting lever 91 engaged by a cam 106 loosely mounted on a shaft 108 and connected with a clutch sleeve 110 adapted to engage a clutch member 112 secured to the shaft. The engagement and disengagement of the clutch is controlled by two controller plungers 114 adapted to engage cam grooves in the clutch sleeve and alternately advanced and retracted to cause the engagement of the clutch and its disengagement after a partial revolution. The cams are two-step cams and the plungers are provided on one side with a single engaging surface and on the other side with a two-step engaging surface so that by adjustment of the plungers the cam operating clutch may be caused to turn through either a quarter turn or a half turn before being disengaged as is more fully explained in the patent above referred to. The controller plungers are provided at their outer ends with laterally projecting handles 116 (Fig. 1) by which the operator may adjust either plunger to secure a shift of the reversing clutch from one gear into mid-position or into engagement with the other gear and thus secure a stopping of the table or a reversing of its direction of movement. The shaft 108 is continuously driven through the gears 118 connecting it with the beveled gear 86. The cam 106 is held in its different positions by a spring-operated V-shaped retaining latch 120 of ordinary construction arranged to engage corresponding notches in a flange 122 on the cam. The controller plungers are alternately advanced and retracted through a vertical rock shaft 124 provided near its lower end with gear teeth engaging teeth on the plungers and connected at its upper end by beveled gears 126 (Fig. 2) with the rear end of a horizontal rock shaft 128. The rock shaft 128 projects from the front of the saddle and is provided at its forward end with a handle 130 through which the operator may manually control the plungers 114. The shaft is also provided with a pinion 132 engaged by two vertical plungers 134 (Fig. 1) which are alternately projected into the path of tripping dogs 136 and 138 adjustably secured on the front side of the table. As shown the dog 136 is a short dog which will partially depress the corresponding plunger 134 and partially withdraw the corresponding plunger 114 which in this case is the plunger shown in retracted position in Fig. 5 so that the reversing clutch will be shifted to mid-position and the travel of the table automatically stopped. The dog 138 is a long or reversing dog which fully retracts the plunger which is shown in advance position in Fig. 5 and thus causes an automatic reversal in the direction of travel of the table. This mode of operation is more fully described in the patent above referred to.

The mechanism for causing the table to travel at a slow feeding rate or at a fast or quick traverse rate is mounted in a feed box or casing 140 secured to the under side of the saddle at its left end. This mechanism comprises a drive shaft 142 mounted in the casing 140 and arranged lengthwise of the table. This shaft is driven from the driving shaft 88 of the table reversing mechanism through a shaft 144, one end of which is connected with the shaft 88 by a Hook's joint 146, and the other end of which is connected by a Hook's joint 148 with a sleeve 150 loosely mounted on the shaft 142. The sleeve is connected with the shaft by a clutch 152 connected with a rod 154 within the shaft by a pin 155 which passes through the rod and through short slots in the shaft. The outer end of the rod is provided with a handle 156 by which the clutch may be disengaged from the sleeve 150 to disconnect the fast and slow table feeding mechanism from the driving shaft 88 to enable the table to be easily and conveniently adjusted by manual operation of the fast and slow mechanism.

The train through which the table is moved at a fast rate comprises a gear 158 secured to the shaft 142 and directly engaging a gear 160 loosely mounted on a shaft 162. The train for causing the table to travel at a slow rate comprises a transverse shaft 164, the forward end of which is connected with the shaft 142 by beveled gears 166 and the rear end of which is connected by transposing gears 168 with the rear end of a transverse shaft 170 arranged below the shaft 164. The forward end of the shaft 170 carries one of a series of change gears 172 which connect this shaft with a parallel shaft 174 to which is secured a worm 176 engaging a worm wheel 178 loosely mounted on the shaft 162 opposite the fast running gear 160. With transposing gears of equal diameter on the transverse shafts 164 and 170 a range of feeds such as are ordinarily used on milling machines may be secured by proper changes in the change gears 172. By substituting for the gears of equal diameter, transposing gears one of which is twice the diameter of the other, a range of fine feeds may be secured in case the smaller gear is secured to the shaft 164 and the larger gear to the shaft 170 and an additional range of coarse feeds may be secured by transposing these gears so that the small gear is secured to shaft 170 and the larger gear to shaft 164.

Either the fast running gear or the slow running worm wheel may be connected to drive the shaft 162 through a clutch 180 secured to the shaft and arranged between the gear and worm wheel. The shaft may be moved endwise to engage the clutch by a cam 182 loosely mounted on the shaft 142 and engaging a lever 184, the hub of which is provided with teeth engaging rack teeth on a sleeve 186 which is yieldingly connected with the shaft. The cam is operated by a clutch sleeve 188 connected therewith and adapted to engage a clutch member formed on the hub of the gear 158. The engagement and disengagement of the clutch sleeve is controlled by vertical controller plungers 190 which are alternately advanced and retracted through a transverse rock shaft 192 mounted in the saddle and provided with a pinion 194 engaging teeth formed on the plungers. The forward end of the rock shaft is provided with a handle 196 through which the operator may manually control the shifting of the fast and slow clutch. The shaft 192 is also provided with a pinion 198 engaged by teeth on a controller segment 200 which is pivoted on the front side of the saddle and is provided with a laterally projecting pin 202 adapted to be engaged and shifted in opposite directions by trip dogs 204 and 206 adjustably secured on the front of the table. Motion is transmitted from the shaft 162 to the table through gears 208 (Fig. 1), shaft 210, gears 212, shaft 214 and a pinion 216 on the shaft 214 which engages a rack on the table.

The means for adjusting the table when the fast and slow mechanism is disconnected from its power drive by disengagement of the clutch 152 comprises a shaft 216', the outer end of which is provided with a squared end 218 for receiving a crank handle, and the inner end of which is connected by beveled gears 220 with the worm shaft 174. Through these connections the operator, after disconnecting the clutch 152, may manually turn the worm shaft to move the table through the worm wheel 178 in case the fast and slow clutch is in engagement with the worm wheel, or to move the table through the change gearing, shafts 170 and 164, gears 166 and gears 158 and 160, in case the fast and slow clutch is in engagement with the gear 160.

In order that the fast feed may be rendered active whenever the table is reversed, or is stopped preparatory to its reverse movement, means is provided for causing the fast and slow clutch to be engaged with the fast speed gear whenever the cam which shifts the reversing clutch is rotated to disengage it from that driving gear with which it may be engaged. This means consists of two diametrically opposite cams 222 formed on the flange 122 of the cam 106 and arranged to engage the lower end of a lever 224, the upper end of which is provided with gear teeth engaging teeth formed on a collar 226 carried by a rod 228. The rod extends lengthwise of the table and near its left hand end is provided with teeth engaging a pinion 230 on the rock shaft 192 which controls the shifting of the fast and slow clutch.

The mechanism for automatically stopping and starting the spindle is also controlled through the cam 222 and lever 224 to stop the spindle when the table reversing clutch is shifted to either stop or reverse the table and is controlled through the devices which control the shifting of the fast and slow clutch to start the spindle when this clutch is engaged with its slow speed drive. For this purpose the rear end of the rock shaft 192 which controls the shifting of the fast and slow clutch is connected by Hook's joints 232 and an extensible shaft 234 with a rock shaft 236 which is connected to advance and retract the two controlling plungers 238 which control the clutch sleeve 240 through which the cam 242 for shifting the starting and stopping clutch 38 is actuated. The clutch sleeve 240 and cam 242 are loosely mounted on the shaft 46 and the clutch sleeve is arranged to engage a clutch member on a gear 244 secured to the shaft and engaging a gear 246 on the hub of the constantly rotating gear 36. The rock shaft 236 is provided with teeth directly engaging rack teeth on one of the plungers 238 and also engaging an intermediate pinion 248 which engages rack teeth on the other plunger so that movement of the rock shaft advances one and retracts the other of the plungers. The mechanism for starting and stopping the spindle may be rendered active or inactive at the will of the operator by a rock shaft 250, the outer end of which is provided with an operating handle 252 and the inner end of which is provided with an eccentric stop 254 arranged to be moved into and out of position to engage a flange 256 on the clutch sleeve 240 and arranged to either prevent or permit engagement of the clutch according to the position of the rock shaft.

While it is preferred to employ the construction and arrangement of parts shown and described in embodying the invention in a machine of the manufacturing type it will be understood that this construction and arrangement is not essential to the broader features of the invention and may be varied or modified as found desirable or best suited to the construction and arrangement of the parts of the machine to which the invention is to be applied.

What is claimed is:

1. A milling machine having, in combination, a rotary spindle, a travelling work support, mechanism through which motion is transmitted to the support, means for controlling said mechanism, including tripping devices connected to move in unison with the support, mechanism for rotating the spindle in opposite directions, independent controlling means for the spindle rotating mechanism, including tripping devices connected to move in unison with the support.

2. A milling machine having, in combination, a rotary spindle, a travelling work support, spindle reversing mechanism, work support reversing mechanism and independent controlling means for each of the two reversing mechanisms, each including tripping devices connected to move in unison with the work support.

3. A milling machine having, in combination, a rotary spindle, a travelling work support, mechanism through which the spindle may be rotated in either direction during the travel of the work support in one direction, and automatically acting means for reversing the direction of rotation of the spindle during the continued travel of the support in the opposite direction.

4. A milling machine having, in combination, a rotary spindle, a travelling work support, mechanism for rotating the spindle in opposite directions, and automatically acting controlling devices for reversing the spindle during the continued travel of the work support.

5. A milling machine having, in combination, a rotary spindle, a travelling work support, mechanism for rotating the spindle in opposite directions, and automatically acting controlling devices adjustable to reverse the spindle at any point in the continued travel of the table.

6. A milling machine having, in combination, a rotary spindle, a travelling work support, mechanism for rotating the spindle in opposite directions, controlling devices adjustable to determine the length of travel of the support, and controlling devices to determine the point in the travel at which the spindle is reversed.

7. A milling machine having, in combination, a rotary spindle, a travelling work support, mechanism for rotating the spindle in opposite directions, mechanism for moving the work support in opposite directions, means for automatically and independently controlling said means to selectively determine the direction of rotation of the spindle with relation to the direction of travel of the support.

8. A milling machine having, in combination, a work table, a saddle on which the table travels, mechanism for imparting forward and return movements to the table including a table reversing clutch on the saddle, a clutch shifting cam therefor on the saddle, a cam operating clutch on the saddle, controllers for the cam operating clutch, and tripping devices moving with the table for operating the controllers.

9. A milling machine having, in combination, a work table, a saddle on which the table travels, table reversing mechanism on the saddle, including a reversing clutch, fast and slow feed mechanism for the table driven through the clutch and including a clutch, controlling devices for the clutches, and tripping devices on the table for operating the controlling devices.

10. A milling machine having, in combination, a work table, a saddle on which the table travels, table reversing mechanism on the saddle, including a reversing clutch, an actuating operating cam therefor, and a cam operating clutch, fast and slow feed mechanism on the saddle in train with the reversing clutch and including a clutch, an actuating cam therefor, and a cam operating clutch, controlling devices for the cam operating clutches, and tripping devices on the table for operating the controlling devices.

11. A milling machine having, in combination, a work table, a saddle on which the table travels, table reversing mechanism mounted on one end of the saddle, controlling mechanism at the same end of the saddle, tripping dogs on the table, fast and slow feed mechanism mounted on the other end of the saddle, controlling mechanism therefor at the same end of the saddle, and tripping dogs on the table.

12. A milling machine having, in combination, a work supporting table, a saddle on which the table travels, table reversing mechanism, a casing in which said mechanism is mounted secured to one end of the saddle, tripping dogs on the table for said mechanism, fast and slow feed mechanism for the table, a feed box in which said mechanism is mounted secured to the other end of the saddle, a driving connection from the reversing to the feed mechanism, and tripping dogs on the table for the fast and slow mechanism.

13. A milling machine having, in combination, a work supporting table, fast and slow feed mechanism for the table, driving mechanism therefor, controlling mechanism for the fast and slow feed mechanism, tripping dogs on the table for said controlling mechanism, manually operable means for disconnecting the fast and slow mechanism from its drive, and means for manually operating the fast and slow mechanism to move the table.

14. A milling machine having, in combination, a work supporting table, a fast and slow feed mechanism for the table comprising a driving shaft, a fast speed gear driven from the driving shaft, a shaft geared to the driving shaft, a second shaft, transposing gears connecting the two latter shafts, a worm shaft, change gears between said second shaft and the worm shaft, a worm gear engaging the worm, a clutch for engaging either the fast gear or the worm gear, and connections for transmitting motion from the clutch to the table.

15. A milling machine having, in combination, a work supporting table, a fast and slow feed mechanism for the table comprising a driving shaft, fast and slow trains driven from the shaft, a clutch for connecting either train to feed the table, mechanism controlled from the table for automatically shafting the clutch, a clutch for connecting the driving shaft with a power drive, means for manually shifting the latter clutch and means for manually operating the fast and slow trains when the driving shaft is disconnected from the power drive.

16. A milling machine having, in combination, a rotary spindle, a traveling support, mechanism for moving the support in either direction, means for reversing the direction of travel of the support, and automatically acting means for reversing the direction of rotation of the spindle independently of the reversal of the support.

BENJAMIN P. GRAVES.